(12) United States Patent
Tokiwa

(10) Patent No.: US 10,843,662 B2
(45) Date of Patent: Nov. 24, 2020

(54) GLASS PLATE MODULE

(71) Applicant: NIPPON SHEET GLASS COMPANY, LIMITED, Tokyo (JP)

(72) Inventor: Junichi Tokiwa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 227 days.

(21) Appl. No.: 15/737,606

(22) PCT Filed: Jun. 16, 2016

(86) PCT No.: PCT/JP2016/067993
§ 371 (c)(1),
(2) Date: Dec. 18, 2017

(87) PCT Pub. No.: WO2016/204247
PCT Pub. Date: Dec. 22, 2016

(65) Prior Publication Data
US 2018/0154868 A1     Jun. 7, 2018

(30) Foreign Application Priority Data

Jun. 19, 2015   (JP) .................................. 2015-124287

(51) Int. Cl.
*B60S 1/02*        (2006.01)
*H01R 13/08*     (2006.01)
(Continued)

(52) U.S. Cl.
CPC ................. *B60S 1/026* (2013.01); *B60S 1/02* (2013.01); *H01R 4/02* (2013.01); *H01R 12/57* (2013.01);
(Continued)

(58) Field of Classification Search
CPC ... B60S 1/026; B60S 1/02; H01R 4/02; H01R 12/57; H01R 12/91; H01R 13/04;
(Continued)

(56) References Cited

U.S. PATENT DOCUMENTS 6,267,630 B1 *   7/2001   Machado ................. H01R 4/02
                                                        228/114.5
7,134,201 B2 *  11/2006   Ackerman ......... H01R 43/0207
                                                        29/857
(Continued)

FOREIGN PATENT DOCUMENTS

DE   202013007819 U1   12/2013
EP        1566860 A1    8/2005
(Continued)

OTHER PUBLICATIONS

English Translation of H07-335280; machine generated Dec. 2019 (Year: 2019).*

(Continued)

*Primary Examiner* — Benjamin R Shaw
(74) *Attorney, Agent, or Firm* — Birch, Stewart, Kolasch & Birch, LLP

(57) ABSTRACT

A glass plate module (10) according to the present invention includes a glass plate (1), a conductive layer (2) laminated on the glass plate (1), at least one connection terminal (3) fixed to the conductive layer (2), and made of a conductive material, and an adhesive material (4) for fixing the connection terminal (3) to the conductive layer (2). The connection terminal (3) includes a connector connection portion (37) that is to be electrically connected to an external connector, one or more installation portions (31, 32) that are installed on the conductive layer (2), and electrically connect the connector connection portion (37) and the conductive layer (2), at least one easily deformable portion (34) that is provided between one of the installation portions (31, 32)

(Continued)

and the connector connection portion (37), and is deformable due to an external force, and at least one protrusion (35) provided anywhere between the connector connection portion (37) and the easily deformable portion (34), and protruding in a direction in which the conductive layer (2) extends and that intersects a direction in which the connector connection portion (37) extends.

10 Claims, 9 Drawing Sheets

(51) Int. Cl.
  *H01R 12/57*   (2011.01)
  *H05B 3/84*   (2006.01)
  *H01R 12/91*   (2011.01)
  *H01R 4/02*   (2006.01)
  *H01R 13/04*   (2006.01)
  *H05B 3/86*   (2006.01)
  *H01R 101/00*   (2006.01)

(52) U.S. Cl.
  CPC ............ *H01R 12/91* (2013.01); *H01R 13/04* (2013.01); *H01R 13/08* (2013.01); *H05B 3/84* (2013.01); *H05B 3/86* (2013.01); *H01R 2101/00* (2013.01); *H01R 2201/26* (2013.01); *H05B 2203/016* (2013.01); *H05B 2203/031* (2013.01)

(58) Field of Classification Search
  CPC ............................ H01R 13/08; H01R 2101/00; H01R 2201/23; H05B 3/84; H05B 3/86; H05B 2203/016; H05B 2203/031
  USPC .......................................................... 219/203
  See application file for complete search history.

(56) References Cited

U.S. PATENT DOCUMENTS

| | | | | |
|---|---|---|---|---|
| 2003/0190846 A1* | 10/2003 | Costa | .................. | H05B 3/84 439/845 |
| 2004/0018782 A1* | 1/2004 | Antaya | .................. | H01R 13/04 439/862 |
| 2005/0112291 A1* | 5/2005 | Okajima | .................. | H05B 3/84 427/447 |
| 2005/0221657 A1 | 10/2005 | Hisaeda et al. | | |
| 2012/0067641 A1* | 3/2012 | Tokiwa | .................... | H05B 3/84 174/84 R |
| 2013/0333929 A1* | 12/2013 | Ogawa | ................. | H05K 1/0271 174/257 |
| 2014/0008347 A1* | 1/2014 | Sagawa | .................... | H05B 3/86 219/203 |
| 2015/0155646 A1* | 6/2015 | Takeuchi | ............. | H01R 43/007 439/78 |
| 2017/0312859 A1 | 11/2017 | Tokiwa et al. | | |

FOREIGN PATENT DOCUMENTS

| | | | |
|---|---|---|---|
| EP | 3206257 A1 | | 8/2017 |
| JP | 59-11412 Y2 | | 4/1984 |
| JP | 7-22854 Y2 | | 5/1995 |
| JP | 7-335280 A | | 12/1995 |
| JP | H07-335280 | * | 12/1995 |
| JP | 9-226522 A | | 9/1997 |

OTHER PUBLICATIONS

Chinese Office Acton and Search Report, dated Aug. 16, 2019, for Chinese Applicatton No. 201680035876.7, with an English translation.

Extended European Search Report for European Application No. 16811721.6, dated Jan. 29, 2019.

Japanese Notification of Reasons for Rejection, for Japanese Application No. 2015-124287, dated Apr. 2, 2019, with English translation.

International Search Report for PCT/JP2016/067993 (PCT/ISA/210) dated Aug. 16, 2016.

Written Opinion of the International Searching Authority for PCT/JP2016/067993 (PCT/ISA/287) dated Aug. 16, 2016.

* cited by examiner

GLASS PLATE MODULE

TECHNICAL FIELD

The present invention relates to a glass plate module that is mounted to a window frame of a structure.

BACKGROUND ART

For example, Patent Literature 1 discloses a connection terminal that is connected to a defogger of a rear glass of an automobile. A configuration is adopted in which a connector for supplying a current from the outside is connected to this connection terminal, and the current supplied from the connector is supplied to the defogger via the connection terminal to cause the defogger to generate heat.

CITATION LIST

Patent Literature

Patent Literature 1: JP H7-335280A

SUMMARY OF INVENTION

Technical Problem

Incidentally, after a conductive layer such as a defogger is laminated on a glass plate, a connection terminal such as described above is fixed to this conductive layer via an adhesive material such as solder. After that, this glass plate is conveyed to a structure such as an automobile to which the glass plate is to be mounted. However, the connection terminal is conveyed in a state of protruding from the glass plate, and thus there is a risk that the connection terminal will catch on something during the conveyance route, and upon receiving an external force, the connection terminal will become detached from the adhesive material, or the adhesive material will crack. The present invention was made in order to solve the foregoing problem, and it is an object thereof to provide a glass plate module that can prevent the connection terminal from becoming detached from the adhesive material and the adhesive material from being damaged, even in a case of receiving an external force.

Solution to Problem

A glass plate module according to the present invention includes a glass plate, a conductive layer laminated on the glass plate, at least one connection terminal fixed to the conductive layer, and made of a conductive material, and an adhesive material for fixing the connection terminal to the conductive layer, the connection terminal including a connector connection portion configured to be electrically connected to an external connector, one or more installation portions that are installed on the conductive layer, and electrically connect the connector connection portion and the conductive layer, at least one easily deformable portion that is provided between one of the installation portions and the connector connection portion, and is deformable due to an external force, and at least one protrusion provided anywhere between the connector connection portion and the easily deformable portion, and protruding in a direction in which the conductive layer extends and that intersects a direction in which the connector connection portion extends.

According to this configuration, the following effects can be acquired. When the connection terminal comes into contact with a worker or the like, for example, and receives an external force, if the external force acts directly on the installation portion, there is a risk that the installation portion will become detached from the adhesive material, or damage to an adhesive member such as cracks forming in the adhesive material will occur. In view of this, in the present invention, the easily deformable portion that is deformable due to an external force is provided between the installation portion and the connector connection portion, and thus upon receiving an external force, the external force is received by the easily deformable portion, and is absorbed due to deformation of the easily deformable portion, and thus it is possible to prevent the external force from reaching the installation portion. Furthermore, contact with an external obstacle is likely to occur at a position distanced from the installation portion by providing the protrusion anywhere between the connector connection portion and the easily deformable portion. In particular, the protrusion protrudes in a direction in which the conductive layer extends and that intersects a direction in which the connector connection portion extends, and thus it is possible to prevent the installation portion from becoming detached and the adhesive member from being damaged, against the action of an external force from such a direction.

Note that the connector connection portion includes an aspect in which a conductive wire is directly connected to the connector connection portion, for example, as well as an aspect in which a terminal with connector of a structure is connected to the connector connection portion. In addition, the protrusion is provided between the installation portion and the connector connection portion, and this means that an aspect is also included in which the protrusion is also connected to the installation portion and the connector connection portion. Furthermore, the protrusion protruding in "a direction in which the conductive layer extends and that intersects a direction in which the connector connection portion extends" at least means a direction that is not parallel with the connector connection portion and that intersects therewith, including being orthogonal thereto. In addition, the direction in which the conductive layer extends does not strictly need to be parallel to the conductive layer, and it is merely meant to exclude an aspect in which the protrusion is orthogonal to the conductive layer.

In the above glass plate module, the protrusion can protrude outward of a connection site between the easily deformable portion and the installation portion. By the protrusion protruding outward of the connection site between the easily deformable portion and the installation portion in this manner, contact with the protrusion that protrudes on the connector connection portion side relative to the easily deformable portion is more likely to occur.

In the above glass plate module, the protrusion can be coupled to the easily deformable portion.

In the above glass plate module, the easily deformable portion can be configured such that both two end portions of a plate material elastically approach and separate from each other by bending the plate material.

In the above glass plate module, the connection terminal can be configured as follows. Specifically, a configuration can be adopted in which the connection terminal includes two installation portions and two easily deformable portions, one of the easily deformable portions is provided between one of the installation portions and the connector connection portion, and the other easily deformable portion is provided between the other installation portion and the connector connection portion.

In the above glass plate module, the protrusion can protrude in a direction perpendicular to a direction in which the two installation portions are aligned.

In the above glass plate module, at least one of the two easily deformable portions can be configured such that two end portions of a plate material elastically approach and separate from each other by bending the plate material.

In the above glass plate module, at least one of the two easily deformable portions can be configured to be deformable by having a smaller width than the connector connection portion.

In the above glass plate module, the adhesive material can be made of lead-free solder.

In the above glass plate module, the installation portion can be formed in a circular shape or an elliptical shape.

According to this configuration, the following effects can be acquired. For example, if solder is used as the adhesive material, the solder becomes liquid when melted, and spreads in a circular shape. Therefore, if the shape of the solder when melted and spread and the shape of the installation portion are roughly the same, there is an advantage that stress is unlikely to concentrate when the solder shrinks at a cold temperature. Therefore, from the viewpoint that stress is unlikely to concentrate, there is also an effect that the impact resistance performance of the connection terminal is improved.

Advantageous Effects of Invention

According to the glass plate module of the present invention, even in a case of receiving an external force, it is possible to prevent the connection terminal from becoming detached from the adhesive material, and the adhesive material from being damaged.

DESCRIPTION OF EMBODIMENTS

A. First Embodiment

Figure 1:
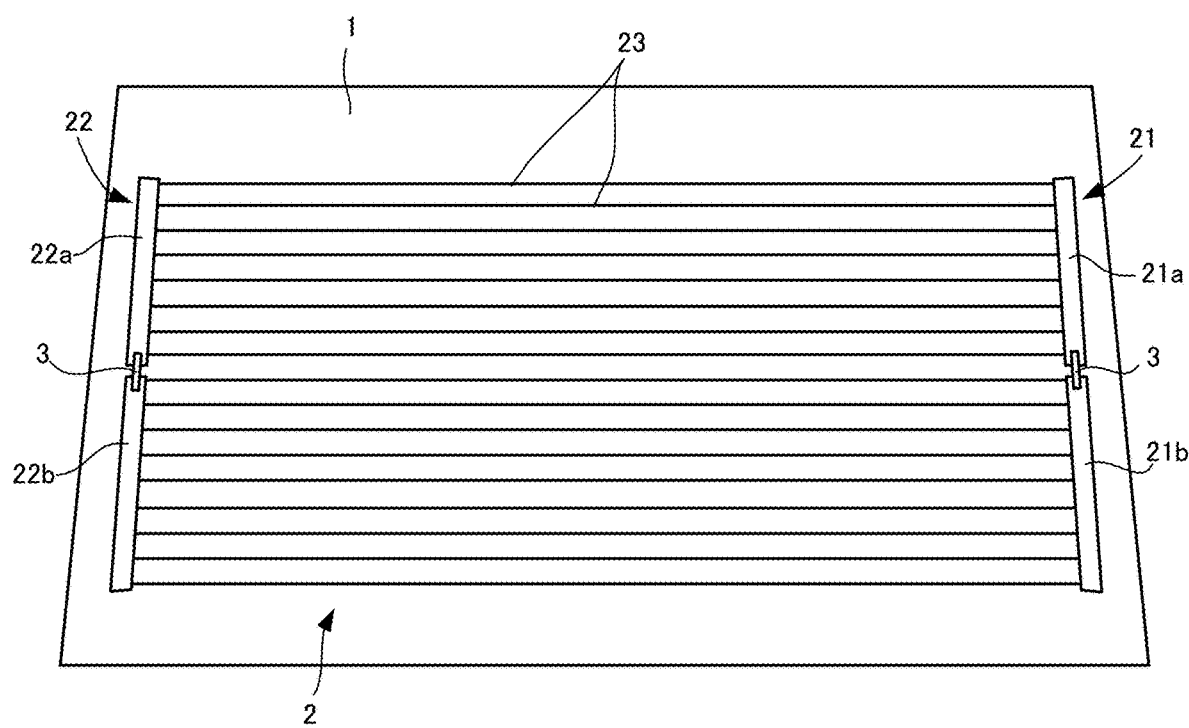
FIG. 1 is a plan view of a glass plate module according to a first embodiment of the present invention.
Figure 2:
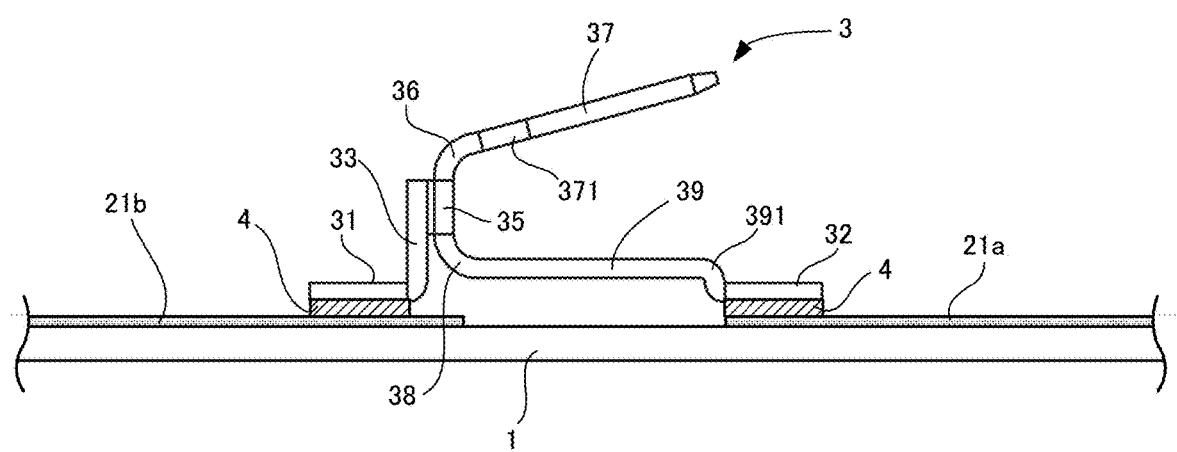
FIG. 2 is an enlarged side view of FIG. 1.

A first embodiment of a glass plate module according to the present invention will be described below with reference to the drawings. FIG. 1 is a plan view of this glass plate module, and FIG. 2 is an enlarged side view of FIG. 1. As shown in FIGS. 1 and 2, this glass plate module is to be fitted in a window frame of an automobile. Specifically, this glass plate module 10 has a glass plate 1, a defogger 2 (a conductive layer) laminated on this glass plate 1, and a pair of connection terminals 3 that are attached to this defogger 2 using solder 4. Connectors for supplying electric power (not illustrated) that extend from inside the automobile are respectively attached to the connection terminals 3, and an electric current supplied from the connectors is supplied to the defogger via the connection terminals 3. The constituent members will be described below.

1. Glass Plate

A known automotive glass plate can be used as the glass plate 1. For example, heat absorbing glass, regular clear glass or green glass, or UV green glass may be used as the glass plate 1. However, the glass plate 1 as described above is required to attain visible light transmittance that conforms to the safety standards of the country in which the automobile is to be used. For example, an adjustment can be made such that solar absorptance, visible light transmittance and the like satisfy the safety standards. An example of the composition of clear glass and an example of the composition of heat absorbing glass are shown below.

Clear Glass $SiO_2$: 70 to 73 mass %

$Al_2O_3$: 0.6 to 2.4 mass %

CaO: 7 to 12 mass %

MgO: 1.0 to 4.5 mass %

$R^2O$: 13 to 15 mass % (R is an alkali metal)

Total iron oxide (T-$Fe_2O_3$) in terms of $Fe_2O_3$: 0.08 to 0.14 mass %

Heat Absorbing Glass

With regard to the composition of heat absorbing glass, a composition obtained based on the composition of clear glass by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass % and reducing the components (mainly $SiO_2$ and $Al_2O_3$) forming the framework of glass by an amount corresponding to the increases in T-$Fe_2O_3$, $CeO_2$, and $TiO_2$ can be used, for example.

Note that the type of the glass plate 1 is not limited to clear glass or heat absorbing glass, and can be selected as appropriate according to the embodiment. For example, the glass plate 1 may be a resin window made of acrylic resin, polycarbonate resin, or the like.

In addition, the thickness of the glass plate 1 according to this embodiment does not have to be limited particularly. However, from the viewpoint of weight reduction, the thickness of the glass plate 1 may be set in a range of 2.2 to 5.1 mm, a range of 2.4 to 3.8 mm, and a range of 2.7 to 3.2 mm. Furthermore, the thickness of the glass plate 1 may be set to be 3.1 mm or smaller.

In addition, the glass plate 1 as described above may be laminated glass having an interlayer made of resin or the like sandwiched by a plurality of glass plates, instead of being a single glass plate.

2. Defogger

Next, the defogger 2 will be described. As shown in FIG. 1, the defogger 2 has a pair of a first busbar 21 and a second busbar 22 for supplying electric power, which extend in the up-down direction along two side edges of the glass plate 1. The busbars 21 and 22 are divided in the vicinity of the center in the up-down direction, and in the busbars 21 and 22, sections arranged on the upper side will be referred to as upper parts 21a and 22a, and sections arranged on the lower side will be referred to as lower parts 21b and 22b. In addition, a plurality of horizontal elements 23 are arranged in parallel at a predetermined interval between the busbars 21 and 22.

In addition, an electric current is supplied from the connection terminal 3 that is attached to the first busbar 21, and the connection terminal that is attached to the second busbar 22 is grounded via a connector. Due to this configuration, when an electric current is supplied to the defogger 2, defogging heat is generated in the horizontal elements 23. Note that the busbars 21 and 22 and the horizontal elements 23 are formed by printing electroconductive silver paste onto the surface of the glass plate 1 and firing the silver paste, for example. However, the material of the defogger 2 is not limited to this silver paste, and can be selected as appropriate.

3. Connection Terminal

Figure 3:
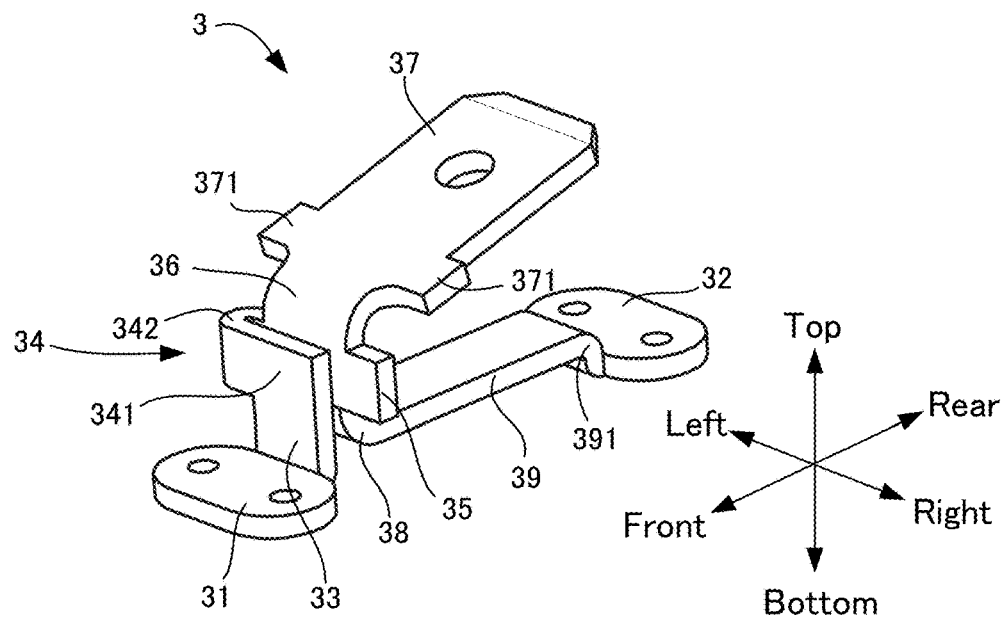
FIG. 3 is a perspective view of a connection terminal according to the first embodiment when viewed from the front side.
Figure 4:
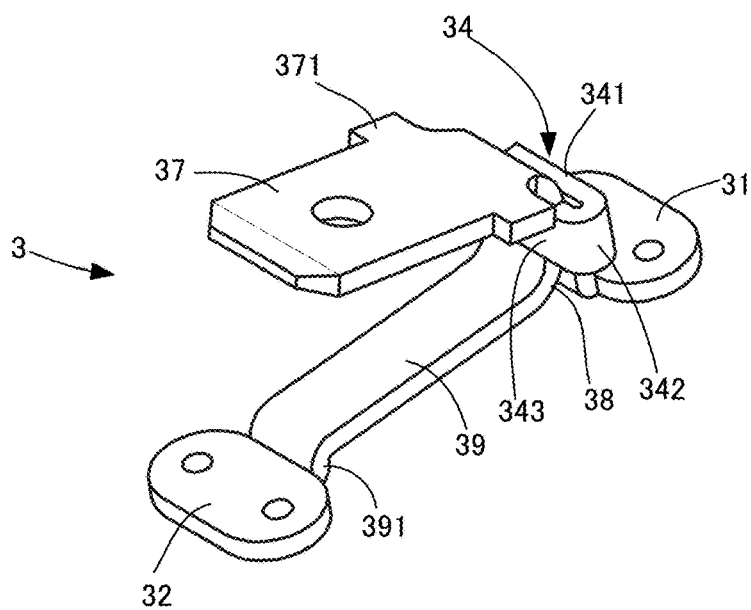
FIG. 4 is a perspective view of the connection terminal in FIG. 3 when viewed from the rear side.
Figure 5:
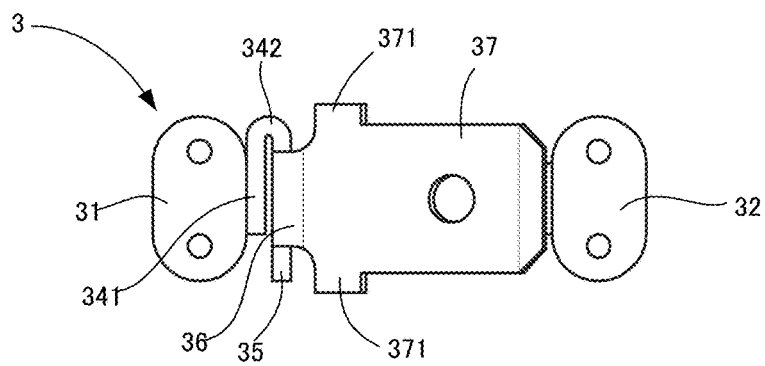
FIG. 5 is a plan view of the connection terminal in FIG. 3.
Figure 6:
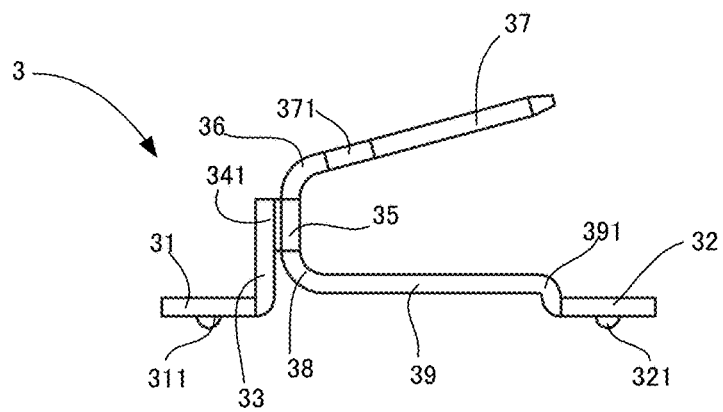
FIG. 6 is a right side view of FIG. 5.
Figure 7:
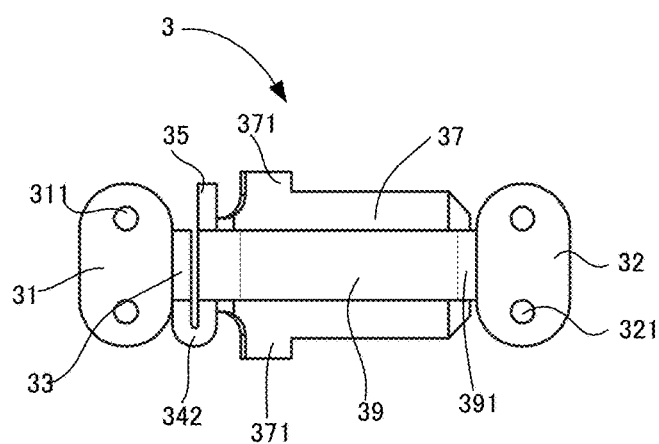
FIG. 7 is a bottom view of FIG. 5.

Next, the connection terminal will be described. Description will be given with reference to FIGS. 3 to 7. FIG. 3 is a perspective view of a connection terminal when viewed from the front right side, FIG. 4 is a perspective view of the connection terminal when viewed from the rear left side, FIG. 5 is a plan view of the connection terminal, FIG. 6 is a right side view of FIG. 5, and FIG. 7 is a bottom view of FIG. 5. For convenience of description, description will be given below based on the directions shown in FIG. 3. Specifically, description will be given with the up-down direction in FIG. 4 being referred to as the right-left direction or the width direction, the right-left direction in FIG. 5 being referred to as the front-back direction, and the up-down direction in FIG. 5 being referred to as the up-down direction.

As shown in FIGS. 3 to 7, the connection terminal according to this embodiment is formed integrally by folding electrically conductive materials (plate materials) such as metal plates, and includes a pair of installation portions that are installed on the busbars 21 and 22 of the defogger 2. Hereinafter, an installation portion on the left in FIG. 3 is referred to as a first installation portion 31, and the installation portion on the right is referred to as a second installation portion 32. The connection terminal 3 is arranged on each of the above-described busbars 21 and 22, and the first installation portion 31 and the second installation portion 32 are respectively fixed to the upper part 21a or 21b and the lower part 22a or 22b of the busbar 21 or 22.

The first installation portion 31 is formed in an elliptical shape in a plan view, and a pair of hemispherical projections 311 extending downward are formed on the lower face of the first installation portion 31. In addition, a rectangular standing portion 33 extending upward from the end portion at the back of the first installation portion 31 is connected to the first installation portion 31. The width in the right-left direction of the standing portion 33 is smaller than the width in the right-left direction of the first installation portion 31. In addition, a shock absorption portion (easily deformable portion) 34 having a U-shape in a plan view is coupled to the upper end portion of the standing portion 33. This shock absorption portion 34 is constituted by a rectangular first section 341 that is coupled to the upper end portion of the standing portion 33, a curved portion 342 that is coupled to the end portion on the left side of this first section 341, protrudes on the left side, and curves backward in a U-shape, and a rectangular second section 343 that is coupled to the end portion on the right side of this curved portion 342, and is arranged in parallel to the first section 341. The first section 341 and the second section 343 are formed in the same shape, and arranged with a gap therebetween, and the end portions on the right side of the first section 341 and the second section 343 are substantially at the same position.

A rectangular protrusion 35 protruding on the right side is coupled to the end portion on the right side of the second section 343 of the shock absorption portion 34. This protrusion 35 protrudes on the right side relative to the standing portion 33 and the first section 341 of the shock absorption portion 34, but extends to roughly the same position as the end portion on the right side of the first installation portion 31.

A rectangular connector connection portion 37 is coupled to the upper end of the second section 343 of the shock absorption portion 34 via a first curved portion 36 that extends backward, and curves upward as so to form a projection. Accordingly, the connector connection portion 37 is inclined upward as extending backward due to the first curved portion 36. This connector connection portion 37 is for inserting a connector (not illustrated) for supplying electric power or for grounding, and stoppers 371 protruding in the right and left directions are respectively formed on the two sides of the base end portion of the connector connection portion 37, which is close to the second section 343. These stoppers 371 are for restricting the length of insertion of the connector. Note that the stoppers 371 respectively protrude in the right and left directions to roughly the same positions as the two end portions of the first installation portion 31.

On the other hand, a rectangular coupling portion 39 is coupled to the lower end of the second section 343 of the shock absorption portion 34 via a second curve portion 38 that extends rearward, and curves downward to form a projection. This coupling portion 39 extends rearward so as to be parallel to the first and second installation portions 31 and 32 due to the second curve portion 38. The width in the right-left direction of the coupling portion 39 is small, and is roughly half the width of the connector connection portion 37. In addition, the length in the front-back direction of the coupling portion 39 is roughly the same as the connector connection portion 37, and the positions of the back end portion of the connector connection portion 37 and the back end portion of the coupling portion 39 roughly coincide. In addition, the second installation portion 32 is coupled to the back end portion of the coupling portion 39 via a third curved portion 391 that curves downward. The size of the second installation portion 32 is the same as that of the first installation portion 31, and the second installation portion 32 and the first installation portion 31 are arranged on the same plane such that the positions in the up-down direction of the second installation portion 32 and the first installation portion 31 coincide.

4. Solder

Next, solder that is applied to both the installation portions 31 and 32 of the connection terminal 3 will be described. Two types of solder are used in this embodiment, namely, lead-free solder and leaded solder, either of which is applied to the back faces of the installation portions 31 and 32 according to the usage, and is fixed onto the busbars 21 and 22 of the defogger 2. Lead-free solder and leaded solder are known, and there is no limitation in particular as long as the solder can electrically connect an electroconductive connection terminal 3 such as described above and the defogger 2. Note that there is a possibility that lead-free solder whose Sn content is 90% or more will crack when joined to a laminated glass plate since the material is hard. Even in such a case, it suffices that soft lead-free solder such as indium solder and bismuth solder is used for the joining.

5. Characteristics

As described above, according to the glass plate module of this embodiment, the following effects can be acquired.

(1) The above glass plate module 10 is conveyed along a predetermined conveyance route to an automobile in order to be mounted to a window frame of the automobile. At this time, there is a risk that the connection terminal 3 protruding from the glass plate 1 comes into contact with a worker, a working tool and the like. When the connection terminal 3 receives an external force due to the contact in this manner, if the external force acts directly on the installation portions 31 and 32, there is a risk that the installation portions 31 and 32 will become detached from the solder 4, or damage to the solder 4 such as cracks forming in the solder 4 occurs. In view of this, in this embodiment, the shock absorption portion 34 that is deformable due to an external force is provided between the connector connection portion 37 and the installation portions 31 and 32. Accordingly, when an external force is received, the external force is received by the shock absorption portion 34, and is absorbed by the first section 341 and the second section 343 approaching and separating from each other, and thus it is possible to prevent the external force from being transmitted to the installation portions 31 and 32. Furthermore, by providing the protrusion 35 at the end portion of the second section 343 of the shock absorption portion 34, direct contact with the installation portions 31 and 32 is avoided, and contact with an external obstacle at a position distanced from the installation portions 31 and 32 is more likely to occur. In particular, the protrusion 35 protrudes in the right direction, and thus it is possible to prevent the installation portions 31 and 32 from becoming detached and the solder 4 from being cracked, against contact from this direction.

(2) In addition, the protrusion 35 protrudes outward of the standing portion 33, which is a connection site between the shock absorption portion 34 and the first installation portion 31, and thus the protrusion 35 is more likely to come into contact with an external obstacle than the standing portion 33. Therefore, it is possible to further prevent an external force from acting directly on the standing portion 33, and the first installation portion 31 from becoming detached from the solder 4. From this viewpoint, the end portion on the left side of the shock absorption portion 34, namely the first curved portion 342 also protrudes on the right side relative to the standing portion 33, and thus this portion also corresponds to the protrusion of the present invention.

(3) In this embodiment, the width in the right-left direction of the coupling portion 39 is made thinner than the connector connection portion 37 such that the coupling portion 39 is likely to bend. This makes it possible to absorb an external force, and to prevent the second installation portion from becoming detached from the solder 4. From this viewpoint, the coupling portion 39 corresponds to the easily deformable portion of the present invention.

(4) In this embodiment, the installation portions 31 and 32 and the busbars 21 and 22 are fixed using the solder 4, but lead-free solder is generally lower in viscosity and harder than leaded solder, and thus is likely to crack due to shock. Therefore, the connection terminal 3 according to this embodiment is particularly advantageous when connected to the defogger 2 using lead-free solder.

B. Second Embodiment

Next, a second embodiment of the present invention will be described. The second embodiment is different from the first embodiment only in the configuration of a connection terminal, and other configurations are the same, and thus only the connection terminal will be described below.

1. Connection Terminal

Figure 8:
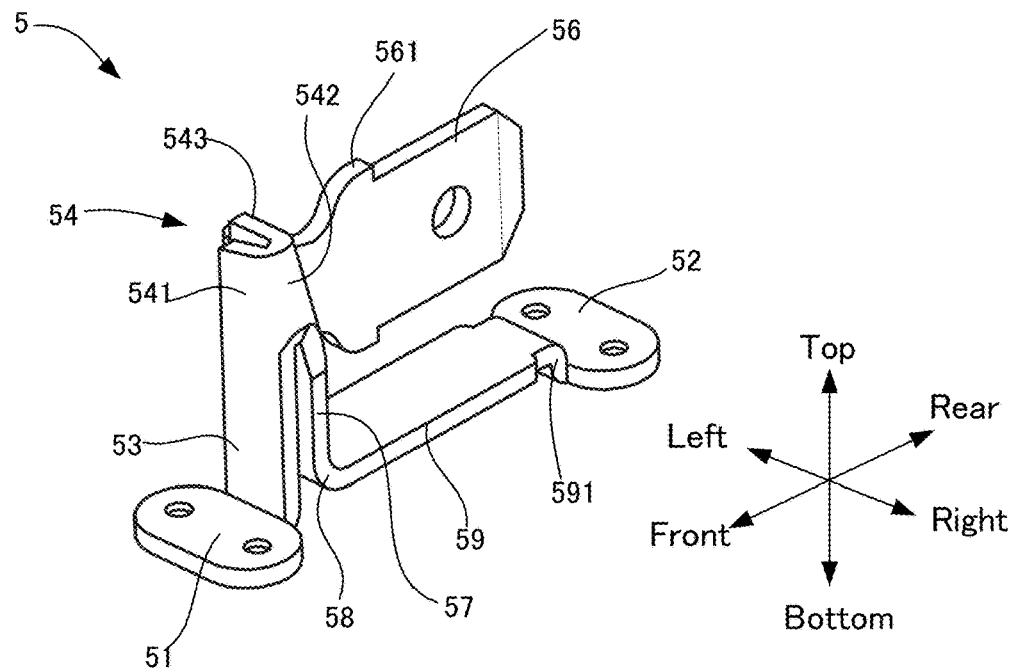
FIG. 8 is a perspective view of a connection terminal according to a second embodiment of the present invention when viewed from the front right side.
Figure 9:
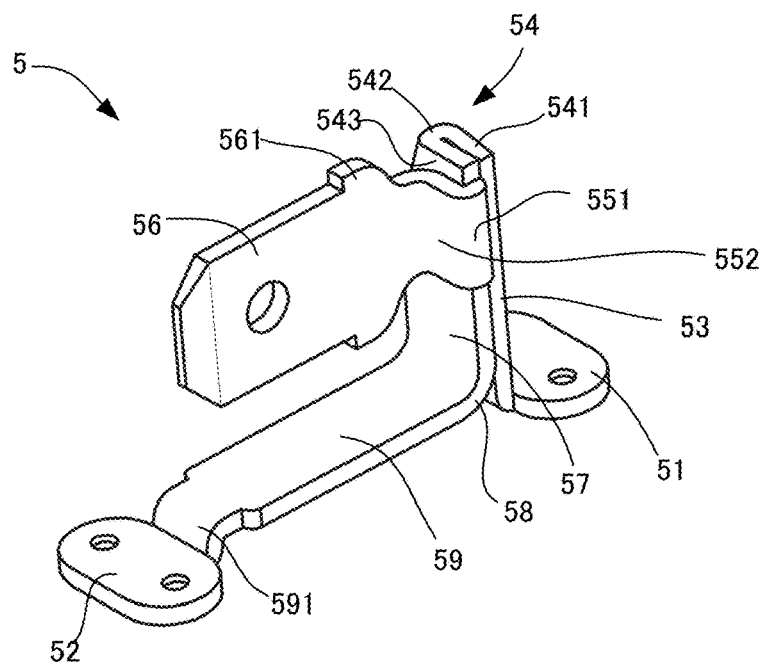
FIG. 9 is a perspective view of the connection terminal in FIG. 8 when viewed from the rear left side.
Figure 10:
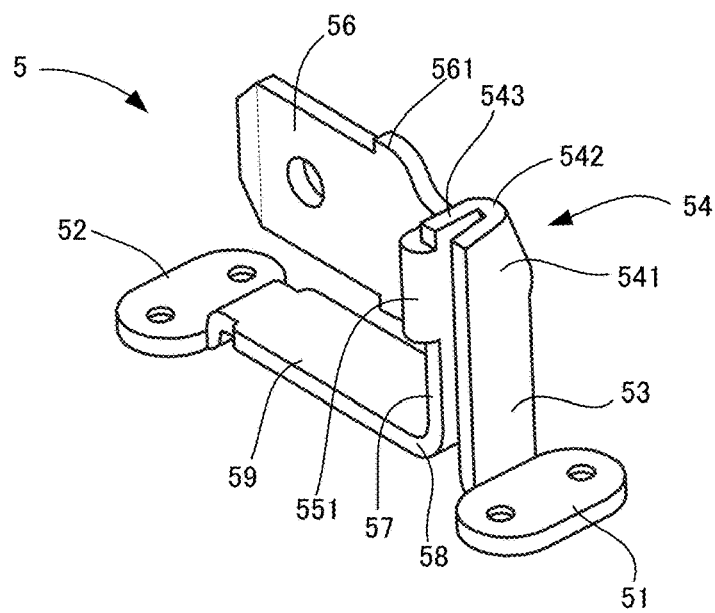
FIG. 10 is a perspective view of the connection terminal in FIG. 8 when viewed from the front left side.
Figure 11:
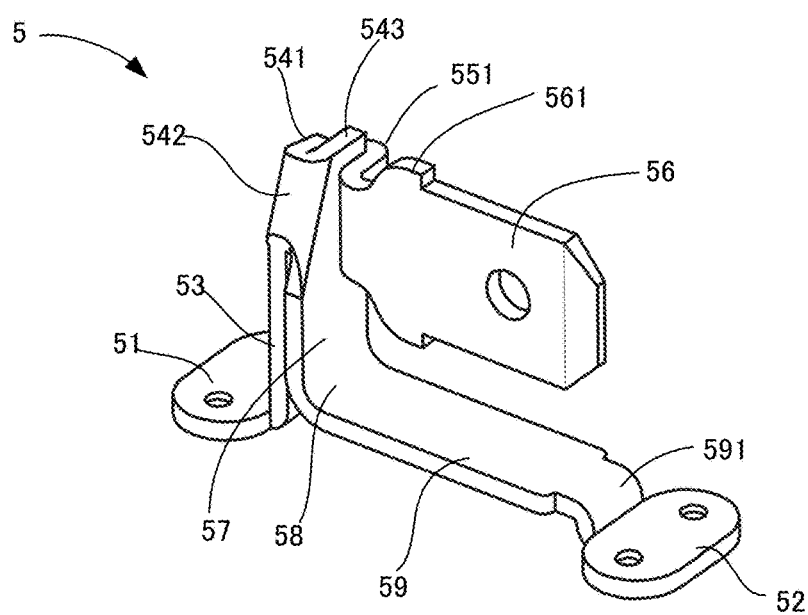
FIG. 11 is a perspective view of the connection terminal in FIG. 8 when viewed from the rear right side.

The connection terminal according to this embodiment will be described below with reference to FIGS. 8 to 11. FIG. 8 is a perspective view of the connection terminal when viewed from the front right side, FIG. 9 is a perspective view of the connection terminal when viewed from the rear left side, FIG. 10 is a perspective view of the connection terminal when viewed from the front left side, and FIG. 11 is a perspective view of the connection terminal when viewed from the rear right side. For convenience of description, description will be given below based on the directions shown in FIG. 8.

As shown in FIGS. 8 to 11, a connection terminal 5 according to this embodiment is formed integrally of an electrically conductive material such as metal, and includes a pair of installation portions that are installed on busbars 21 and 22 of a defogger 2. Hereinafter, the installation portion on the left in FIG. 8 is referred to as a first installation portion 51, and the installation portion on the right is referred to as a second installation portion 52. The connection terminal 5 is arranged on each of the above-described busbars 21 and 22, and the first installation portion 51 and the second installation portion 52 are respectively fixed to an upper part 21a or 22a and a lower part 21b or 22b of the busbar 21 or 22.

The first installation portion 51 is formed in an elliptical shape in a plan view, and a pair of hemispherical projections 511 protruding downward are formed on the lower face of the first installation portion 51. In addition, a rectangular standing portion 53 extending upward from the end portion on the rear side of the first installation portion 51 is connected to the first installation portion 51. The width in the right-left direction of the standing portion 53 is smaller than the width in the right-left direction of the first installation portion 51. In addition, a shock absorption portion (an easily deformable portion) 54 in a U-shape in a plan view is coupled to the upper end portion of the standing portion 53. This shock absorption portion 54 is constituted by a trapezoidal first section 541 coupled to the upper end portion of the standing portion 53, a curved portion 542 coupled to the end portion on the right side of this first section 541, protruding on the right side, and curved rearward in a U shape, and a trapezoidal second section 543 coupled to the end portion on the left side of this curved portion 542, and arranged in parallel to the first section 541. The first section 541 and the second section 543 are formed in trapezoidal shapes whose right end portions are cut away to be inclined, and the curved portion 542 is provided so as to couple these inclined portions. In addition, the first section 541 and the second section 543 are formed substantially in the same shape, and are arranged with a gap therebetween, and the end portions on the left side of the first section 541 and the second section 543 are substantially at the same position.

A second curved portion 551 protruding on the left side and curved rearward in a U-shape is coupled to the end portion on the left side of the second section 543 of the shock absorption portion 54, and a rectangular supporting portion 552 is coupled (to the second section 543) via this second curved portion 551. The supporting portion 552 extends so as to be parallel to the second section 543 of the shock absorption portion 54 and to be in contact with the second section 543, and a connector connection portion 56 is coupled to the end portion on the right side of the supporting portion 552. The connector connection portion 56 is formed in a plate shape extending in the up-down direction, and extending backward. This connector connection portion 56 is for inserting a connector (not illustrated) for supplying electric power or for grounding, and stoppers 561 protruding in the right and left directions are respectively formed on the two sides of the base end portion of the connector connection portion 56, which is close to the supporting portion 552. These stoppers 561 are for restricting the length of insertion of the connector.

In addition, a rectangular extension portion 57 extending in parallel to the standing portion 53 is formed at the lower end of the second section 543 of the shock absorption portion 54. The width in the right-left direction of this extension portion 57 is greater than the standing portion 53. Therefore, the end portions on the right and left sides of the extension portion 57 protrude outward of the end portions on the right and left sides of the standing portion 53. A rectangular coupling portion 59 is then coupled to the lower end of the extension portion 57 via a third curved portion 58 extending rearward and curved downward so as to form a projection. This coupling portion 59 extends, due to the third curved portion 58, rearward so as to be parallel to the first and second installation portions 51 and 52. The width in the right-left direction of the coupling portion 59 is the same as the extension portion 57, and the length in the front-back direction of the coupling portion 59 is roughly the same as the connector connection portion 37, and the position of the back end portion of the connector connection portion 56 and the position of the back end portion of the coupling portion 59 roughly coincide. The second installation portion 52 is then coupled to the back end portion of the coupling portion 59 via a fourth curved portion 591 curved downward. The size of the second installation portion 52 is the same as the size of the first installation portion 51, and the second installation portion 52 and the first installation portion 51 are arranged on the same plane such that the positions in the up-down direction of the second installation portion 52 and the first installation portion 51 coincide.

2. Characteristics

With the connection terminal 5 according to the second embodiment, effects similar to those of the connection terminal 3 of the first embodiment can be acquired, and the following effects can be further acquired. Specifically, this connection terminal 5 has the second curved portion 551 protruding on the left side relative to the shock absorption portion 54 and the extension portion 57 protruding on the right and left sides relative to the standing portion 53 below the shock absorption portion 54, and these correspond to the protrusion of the present invention. Therefore, contact with the second curved portion 551 and the extension portion 57 protruding in the right and left sides relative to the standing portion 53 is more likely to occur, and it is possible to prevent direct contact occurring with the standing portion 53 and an external force from acting thereon. Accordingly, it is possible to prevent the installation portions 51 and 52 from becoming detached from the solder 4, and the solder 4 from cracking, against not only contact from the right direction as in the first embodiment but also contact from the left direction.

C. Variations

One embodiment of the present invention has been described above, but the present invention is not limited to the above embodiment, and various modifications can be made without departing from the gist of the invention. In addition, a plurality of variations described as follows can be combined as appropriate.

1. In the above embodiments, the easily deformable portion according to the present invention is constituted by the shock absorption portion 34 or 54 and the coupling portion 39 or 59, but there is no limitation on this, and it suffices for the easily deformable portion to be configured to be deformable so as to absorb an external force upon receiving the force. For example, the easily deformable portion can be formed of an elastic material such as rubber.

Figure 12:
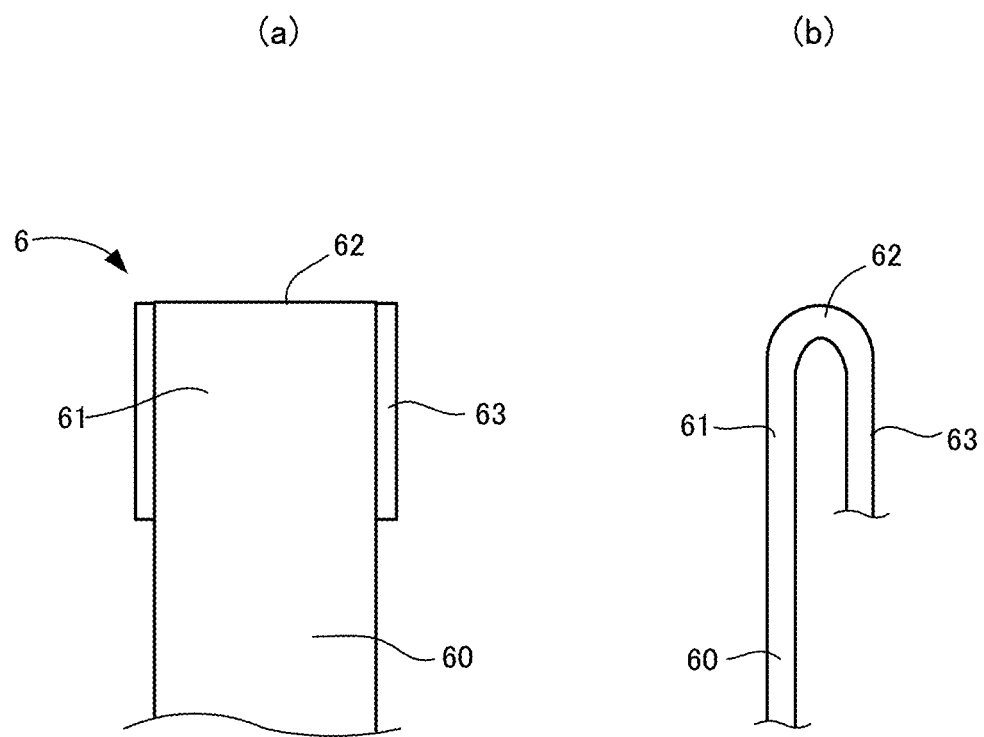
FIG. 12 is a diagram showing another example of an easily deformable portion according to the present invention.

2. In the above embodiments, the shock absorption portions 34 and 54 are connected to the curved portion in the end portion on the right or left side of the first section, but for example, as shown in FIG. 12, a shock absorption portion 6 arranged on the upper side of a standing portion 60 can be configured to have a curved portion 61 in the upper end portion thereof. Accordingly, the width in the right-left direction of a second section 63 can be easily made wider than the standing portion 60.

3. The position at which the protrusion according to the present invention is provided is not particularly limited, and as in the above embodiments, the protrusion can be provided on the shock absorption portions 34 and 54, but it suffices for the protrusion to be provided between the easily deformable portion and the connector connection portion, including on the easily deformable portion and the connector connection portion. Therefore, in the above embodiments, the protrusion may be provided on the connector connection portions 37 and 56, the coupling portions 39 and 59, and the like.

4. In the above embodiments, the connection terminals 3 and 5 are each provided with two installation portions, but the number of installation portions may be three or more, or one. If one installation portion is provided on the connection terminal, the connection terminal can be constituted by the installation portion, the standing portion, the shock absorption portion and the connector connection portion, for example.

5. In the above embodiments, the protrusion of the present invention protrudes in the right-left direction, but may protrude in another direction. Specifically, the protrusion can intersect the connector connection portion in the right-left direction or the front-back direction rather than being parallel to the connector connection portion, and extend in a direction roughly parallel to a conductive layer such as a defogger (may also be inclined upward or downward with respect to the conductive layer).

6. The configuration of the connection terminal described in each of the above embodiments is an example, and the shapes, sizes and the like of the constituent members can be changed as appropriate. For example, the shape of the installation portion may be other than elliptical, and may be circular, rectangular and polygonal.

7. In the above embodiments, the busbars 21 and 22 of the defogger 2 are divided, but may be formed integrally. In this case, both the installation portions 31 and 32 of the connection terminal 3, and both the installation portions 51 and 52 of the connection terminal 5 are arranged on the integrally formed busbars 21 and 22. In addition, in the above embodiments, an example was described in which the connection terminal 3 is fixed to the defogger 2, but apart from a defogger, any electrical component to which an electric current is supplied can applied as the conductive layer of the present invention. For example, an antenna may be applied.

8. In the above embodiments, the conductive layer and the installation portions 31, 32, 51 and 52 are connected using solder as the adhesive material of the present invention, but the adhesive material of the present invention does not have to be solder, and may be an electroconductive adhesive, for example.

9. In the above embodiments, an example was described in which a glass plate module is mounted to a window frame of an automobile, but the glass plate module according to the present invention can be applied to a structure other than an automobile such as a building.

Working Example

A working example of the present invention will be described below. However, the present invention is not limited to the following working example.

1. Preparation of Working Example and Comparison Example

Figure 13:
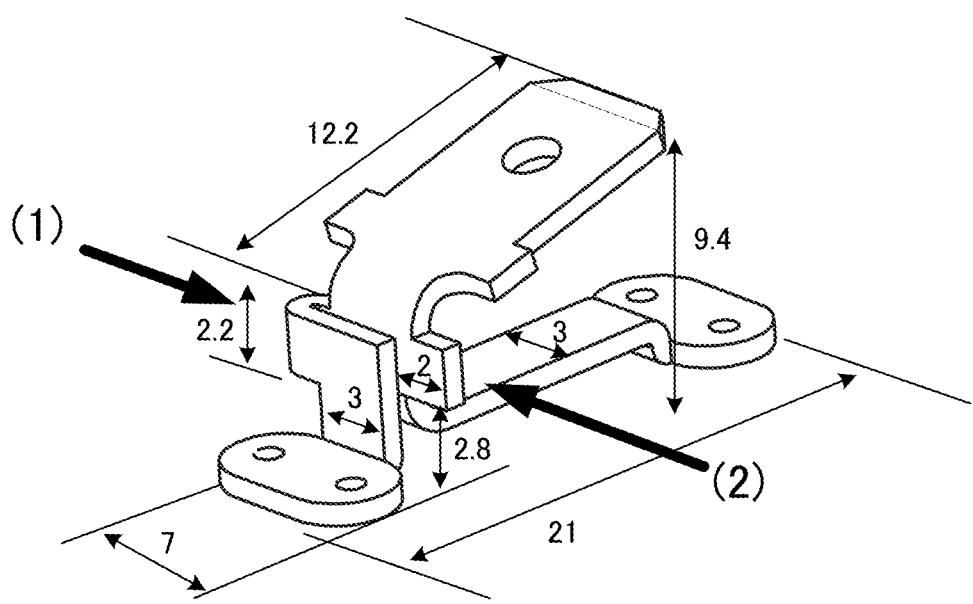
FIG. 13 is a perspective view showing a working example of the present invention.
Figure 14:
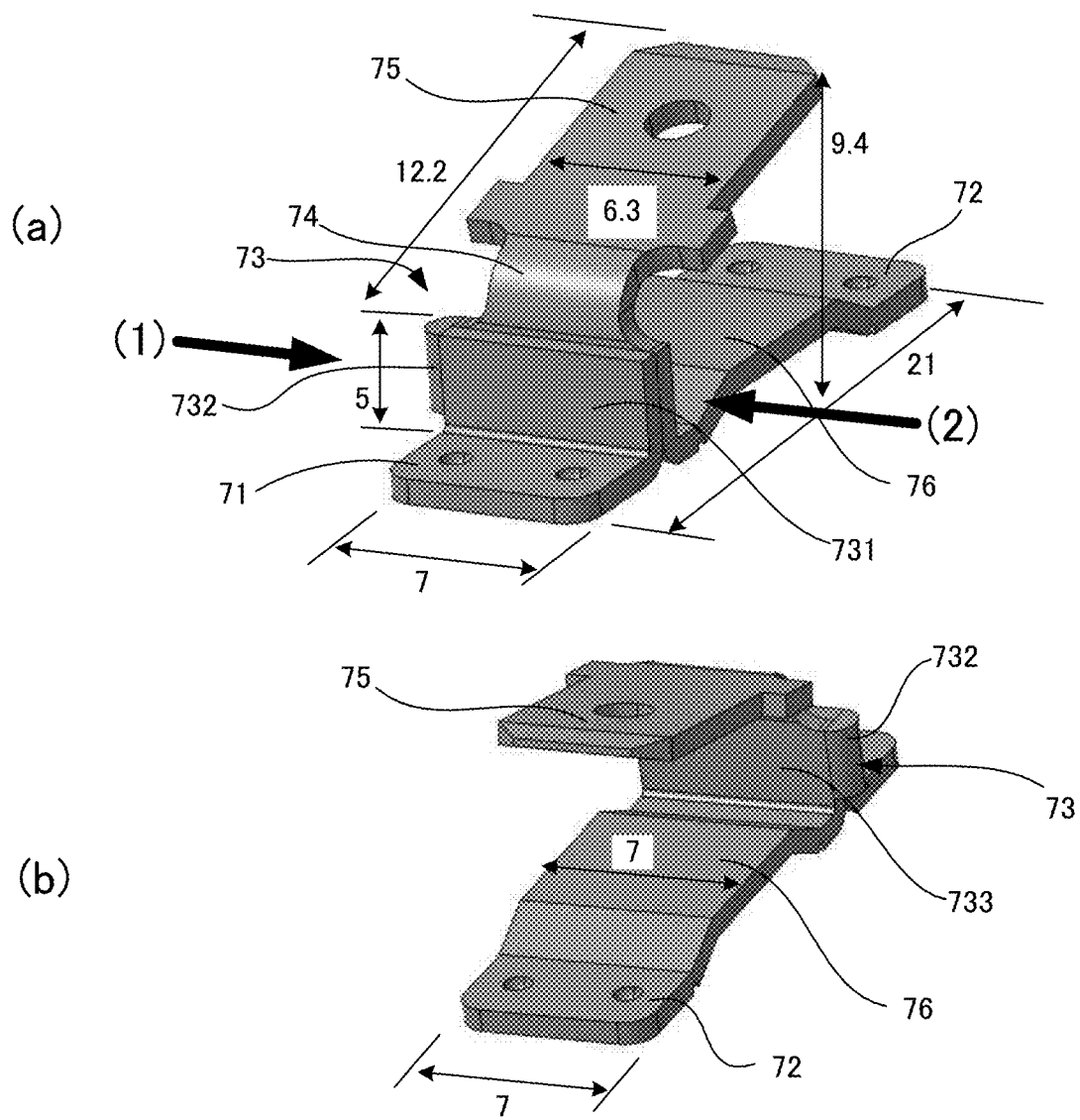
FIGS. 14(*a*) and 14(*b*) are perspective views showing a comparison example of the present invention (FIG. 14(*a*) shows the front side, and FIG. 14(*b*) shows the rear side).

The connection terminal according to the first embodiment was manufactured as a working example. The material of the connection terminal was copper, and the dimensions of the connection terminal are as show in FIG. 13 (the unit is mm). A connection terminal shown in FIG. 14 was manufactured as a comparison example. Differences from the working example are as follows. First, as shown in FIG. 14, a first installation portion 71 and a second installation portion 72 of the comparison example have configurations roughly similar to those of the working example, but do not have a standing portion unlike the working example. In addition, a folded portion 73 having a mode similar to the shock absorption portion is provided above the first installation portion 71, but a first section 731 and a second section 733 are in contact, and these are not configured so as to approach and separate from each other via a curved portion 732. Also, a protrusion is not provided.

A first curved portion 74 and a connector connection portion 75 have configurations roughly similar to those of the working example. In addition, a coupling portion 76 is wide, and has substantially the same width as both the installation portions 71 and 72. The dimensions are as shown in FIG. 14 (the unit is mm).

Subsequently, the installation portions of the working example and the comparison example configured as described above were fixed onto a conductive layer (whose material is Ag) laminated on a glass plate (air-quench tempered glass plate: the thickness 3.1 mm) using lead-free solder (Sn: 96.5% and Ag: 3.5%).

2. Impact Resistance Test

Next, three connection terminals of the working example and three connection terminals of the comparison example configured as described above were prepared, and an impact resistance test was performed on them. Specifically, as shown in FIGS. 13 and 14, an impact was given to the connection terminals of the working example and the comparison example fixed to the conductive layer by causing a weight of 30 g to hit from two directions from a height of 100 mm. A impact 1 is a impact to the curved portion of the shock absorption portion of the working example, and is a impact to the curved portion of the folding portion of the comparison example. Also, a impact 2 is a impact to the protrusion of the working example, and is a impact to the right end portions of the first section and the second section of the comparison example. The impacts 1 and 2 as described above were given 100 times at maximum. The results are as follows.

TABLE 1

| | Working Example | | Comparison Example | |
|---|---|---|---|---|
| | Impact 1 | Impact 2 | Impact 3 | Impact 4 |
| 1 | 100 times | 100 times | 47 times | 9 times |
| 2 | 100 times | 100 times | 100 times | 37 times |
| 3 | 100 times | 100 times | 100 times | 79 times |

In the working example, although the impact 1 was given to all the three connection terminals 100 times, the connection terminals did not detach from the solder, and there was no damage to the solder. On the other hand, in the comparison example, one of the three connection terminals detached from the solder at the 47th impact. In addition, in the working example, although the impact was given to all the three connection terminals 100 times, the connection terminals dis not detach from the solder, and there was no damage to the solder. On the other hand, in the comparison example, the impact test could not be performed 100 times on any of the three connection terminals, and the connection terminals detached from the solder at the 9th, 37th, and 79th impacts, respectively.

Therefore, in the working example, it was found that the impact resistance performance was higher against a impact from the horizontal direction, in particular, a impact from the side on which the protrusion is provided. It is conceivable that this is because in the comparison example, the shock absorption portion and the protrusion as in the working example are not provided.

LIST OF REFERENCE NUMERALS

1: Glass plate
2: Defogger (Conductive layer)
3, 5: Connection terminal
4: Solder
5: Connection terminal
31: First installation portion
32: Second installation portion
34: Shock absorption portion (Easily deformable portion)
35: Protrusion
37: Connector connection portion
39: Coupling portion (Easily deformable portion)
51: First installation portion
52: Second installation portion
54: Shock absorption portion (Easily deformable portion)
56: Connector connection portion
57: Extension portion (Protrusion)
59: Coupling portion (Easily deformable portion)

The invention claimed is:
1. A glass plate module comprising:
a glass plate;
a conductive layer laminated on the glass plate;
at least one connection terminal fixed to the conductive layer, and made of a conductive material; and
an adhesive material for fixing the connection terminal to the conductive layer,
wherein the connection terminal includes:
a connector connection portion configured to be electrically connected to an external connector, one or more installation portions that are installed on the conductive layer, and electrically connect the connector connection portion and the conductive layer, at least one shock absorption portion that is provided between one of the installation portions and the connector connection portion, and is deformable due to an external force, and at least one protrusion provided anywhere between the connector connection portion and the shock absorption portion, and protruding in a substantially planar direction in which the conductive layer extends and that intersects a direction in which the connector connection portion extends.

2. The glass plate module according to claim 1, wherein the protrusion protrudes outward of a connection site between the shock absorption portion and the installation portion.

3. The glass plate module according to claim 1, wherein the protrusion is coupled to the shock absorption portion.

4. The glass plate module according to claim 1, wherein the shock absorption portion is configured such that both two end portions of a plate material elastically approach and separate from each other by bending the plate material.

5. The glass plate module according to claim 1, comprising:
two installation portions and two shock absorption portions,
wherein one of the shock absorption portions is provided between one of the installation portions and the connector connection portion, and
the other shock absorption portion is provided between the other installation portion and the connector connection portion.

6. The glass plate module according to claim 5, wherein the protrusion protrudes in a direction perpendicular to a direction in which the two installation portions are aligned.

7. The glass plate module according to claim 5, wherein at least one of the two shock absorption portions is configured such that both two end portions of a plate material elastically approach and separate from each other by bending the plate material.

8. The glass plate module according to claim 5, wherein at least one of the two shock absorption portions is configured to be deformable by having a smaller width than the connector connection portion.

9. The glass plate module according to claim 1, wherein the adhesive material is made of lead-free solder.

10. The glass plate module according to claim 1, wherein the installation portion is formed in a circular shape or an elliptical shape.

* * * * *